United States Patent Office 3,783,004
Patented Jan. 1, 1974

3,783,004
METHOD OF FORMING A FLAT COATED SURFACE
Gordon M. Parker, Apollo, Pa., assignor to PPG Industries, Inc., Pittsburgh, Pa.
No Drawing. Filed Sept. 21, 1971, Ser. No. 182,559
Int. Cl. B44d 1/50
U.S. Cl. 117—93.31                              18 Claims

ABSTRACT OF THE DISCLOSURE

A film or coating having a wrinkled surface is prepared by subjecting a substantially solventless, actinic light-sensitive, ionizing irradiation-sensitive material to actinic light in an inert atmosphere and subsequently subjecting the material to ionizing irradiation. The preferred films or coatings are prepared from polyacrylates or unsaturated polyester resins.

---

A method of forming films and coatings having good strength, wear-resistance, stain-resistance, and other properties achievable only by extensive crosslinking is that of subjecting radiation-sensitive materials such as polyacrylates and unsaturated polyester resins to ionizing irradiation to cure the materials. This method of irradiating to cure is advantageous as the degree of crosslinking achieved thereby is unobtainable by any other method.

It has been found, however, that the ionizing irradiation treatment of radiation-sensitive materials results in glossy films. This is desirable in some cases but in many cases it is necessary to achieve a strong film or coating which is flat or has a low gloss.

To achieve low gloss in radiation cured materials, solvents have been added as in conventional systems. In this way non-glossy films can be attained. Although the films or coatings from this method are flat (non-glossy), the strength of the film or coating is inferior to that of a film or coating cured by the method of the present invention.

It has now been discovered that a strong film or coating may be achieved with a flattened effect by first subjecting an actinic light-sensitive, ionizing irradiation-sensitive material to actinic light in an inert atmosphere and subsequently subjecting the material to ionizing irradiation to cure.

The actinic light-sensitive, ionizing irradiation-sensitive material may be any substantially solventless, irradiation-sensitive, curable, organic material. It is said to be substantially solventless because substantially all of the material in the composition will be cured eventually by the radiation treatment and, hence, there are substantially no solvents or other materials which are not utilized in the cured material. The most useful organic materials to be used are polyester resins and acrylic resins.

The polyester resins comprise unsaturated polyesters, solubilized in vinyl monomers. The unsaturated polyesters are ordinarily mixtures of alpha-beta ethylenically unsaturated polycarboxylic acids and polyhydric alcohols.

The ethylenically unsaturated polycarboxylic acids include such acids as:

maleic acid             mesaconic acid
fumaric acid            citraconic acid
aconitic acid           itaconic acid and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:

ethylene glycol         polypropylene glycol
diethylene glycol       glycerol
triethylene glycol      neopentyl glycol
polyethylene glycol     pentaerythritol
propylene glycol        trimethylol propane
dipropylene glycol      trimethylol ethane and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:

succinic acid           sebacic acid
adipic acid             isophthalic acid
suberic acid            terephthalic acid
azelaic acid            tetrachlorophthalic acid and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:

styrene                 hexyl acrylate
alpha-methylstyrene     octyl acrylate
divinylbenzene          octyl methacrylate
diallyl phthalate       diallyl itaconate
methyl acrylate         diallyl maleate
methyl methacrylate and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and phthalic or isophthalic acid as the carboxylic acids with styrene or diallyl phthalate or vinyl toluene as the solubilizing monomer.

The acrylic compositions which may be used as the radiation-sensitive materials in this invention may be esters or amides of acrylic or methacrylic acid or co-monomers of such an ester with another copolymerizable monomer. Suitable esters include those of alcohols containing 1 to 8 carbon atoms such as methyl acrylate, methyl methacrylate, ethyl acrylate, butyl methacrylate, octyl acrylate and 2-ethyl hexyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters and allyl compounds, alkylene dimethacrylates and diacrylates, such as 1,3-butylene dimethacrylate, and the like, and triacrylates and trimethacrylates, such as trimethyl propane trimethacrylate, and the like, may also be used. The preferred acrylates are polyacrylates and methacrylates, such as diacrylates, di-methacrylates, tri-acrylates, tri-methacrylates, and the like, such as acryloxy pivalyl acryloxy pivalate, bis(acryloxyethyl)hexahydrophthalate and its telomers, bis(acryloxyethyl)phthalate and its telomers, and the like. Examples of these materials are found in U.S. Pat. 3,455,802.

It is critical to this invention that flatting pigments be present in the composition. By "flatting pigments" is meant actinic light absorbent pigments (pigments which are 60 percent absorbent of actinic light) such as titanium dioxide, benzidine yellow, para red, phthalocyanine blue and phthalocyanine green. Although other pigments which are not highly ultra-violet absorbing such as litharge and antimony oxide and the like may be used also, the non-glossy appearance of the final product requires the presence of flatting pigments.

The amount of actinic light absorbent pigments used must be at least about 5 percent by weight of the composition. Preferably, the composition comprises from about 10 percent to about 75 percent by weight of the ultra-violet light absorbent pigments.

The actinic light-sensitive, ionizing irradiation-sensitive materials may also contain other materials such as dyes, fillers, and the like. In the preferred embodiment, the materials contain photosensitizers such as aromatic hydrocarbons containing from about 6 to about 18 carbon atoms, such as benzene, toluene, and xylene, aromatic amines such as aniline and toluidine, aryl ketones such as acetophenone and xanthone, aliphatic ketones such as acetone, and 2-butanone and other well-known photosensitizers. Generally, the material should comprise from about 0.1 percent by weight of the photosensitizer to about 5 percent by weight of the photosensitizer.

The above materials are first subjected to actinic light such as ultra-violet light in an inert atmosphere. In general, the use of wave lengths in which sensitivity to actinic light occurs is approximately 1800 to 4000 angstrom units. Various suitable sources of the actinic light are available in the art including by way of example, quartz mercury lamps, ultra-violet cored carbon arcs, and high-flash lamps.

The amount of time that the material must be exposed to the actinic light and the intensity of the actinic light, may vary greatly with the type of material treated. The actinic light to which the material is exposed must be enough to cure the surface layer of the coating to a wrinkled appearance and to dry the immediate surface of the coating. Thus, the coating when applied is glossy and wet and the actinic light treatment should be carried out long enough to change the surface to a dry and wrinkled appearance. The wrinkles in the surface of the material will not redissolve back into the material, and the desired wrinkled or flat coating will be obtained.

The treatment to actinic light is carried out in an inert atmosphere containing less than about 150 parts per million of oxygen. The most readily available gaseous atmospheres are nitrogen gas, helium gas, and the like.

After the material is exposed to actinic light in an inert atmosphere, the material is subjected to ionizing irradiation to cure into a strong film or coating with a non-glossy surface.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt-60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The treatment with ionizing irradiation may be carried inert atmosphere. The amount of irradiation employed out in either an oxygen-containing atmosphere or an in the second step may be any total dosage between about 0.02 megarad and about 10 megarads or more. A "rad" is defined as that amount of radiation required to supply 100 ergs per gram of material being treated, and a "megarad" is $10^6$ rads. The total dosage is the total amount of irradiation received by the material. It is only required to subject the material to ionizing irradiation until the material is cured. The surface will become hard and non-glossy.

The above method is particularly useful for coating substrates. The substrate may be coated with the material and then subjected to actinic light in an inert atmosphere and then subjected to ionizing irradiation.

Any conventional coating method may be used such as roll coating, spraying, dip coating and the like. A wide range of substrates may be coated such as paper, wood, glass, metals, plastics, and the like. It is preferred to use substrates that are not degradable by ionizing irradiation.

The invention is useful to produce strong films and coatings which have very low gloss. The need for flat coatings having great strength is found in aluminum sidings, strip coatings for residential use, interior wood coatings, and plastic products. As the coating or film is not glossy or shiny, the method herein is particularly desirable for those materials which need coatings for protection but which are more aesthetic when having a more subtle appearance.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A cardboard substrate was coated by a machined metal applicator with a coating composition comprising 66.6 parts by weight of a vehicle containing 90 percent by weight of acryloxy pivalyl acryloxy pivalate (the reaction product of acrylic acid with hydroxy pivalyl hydroxy pivalate) and 10 percent by weight cellulose acetate butyrate and 33.4 parts by weight of titanium dioxide pigment with one percent by weight based on both vehicle and pigment of a photosensitizing mixture of isobutyl ether of benzoin and amyl ether of benzoin (Triganol 14). The coating had a dry film thickness of 3–4 mils.

The above coated substrate was subjected to ultraviolet light treatment by passing under 6 48-inch Hanovia lamps of 200 watts per square inch intensity at a speed of 65 feet per minute in an atmosphere containing 250 parts per million of oxygen (essentially nitrogen gas). This treatment was followed by subjecting to an electron beam at less than 100 parts per million of oxygen (essentially nitrogen atmosphere) to a total of 5 megarads. The gloss of the resulting coated substrate was determined by the 60° glossmeter test.

The 60° glossmeter test is a standard test for gloss wherein light is reflected off the panel at a 60° angle and the percent reflectance is measured. The glossmeter test is a standard ASTM D523–67 test for evaluating gloss.

The coated substrate of this example had a gloss of only 5.

The above coated substrate was compared to the same coated substrate which has not been pretreated with ultraviolet light and has been cured by electron beam of total dosage of 5 megarads in a nitrogen atmosphere (less than 100 parts per million of oxygen). This coated substrate was tested with the 60° glossmeter test and found to have a gloss reading of 72.

EXAMPLE 2

A cardboard substrate was coated by a machined metal applicator with a coating composition comprising 65.3 parts by weight of a vehicle containing 90.5 percent by weight of hexahydrophthalic ethylene glycol diacrylate, bis(acryloxyethyl)hexahydrophthalate and 9.5 percent by weight of 2-ethylhexyl acrylate and 34.7 parts by weight of a pigment composition comprising 98.8 percent titanium dioxide and 1.2 percent phthalocyanine blue with one percent by weight based on both vehicle and pigment of Triganol 14. The coating had a dry film thickness of 3–4 mils.

The above coated substrate was subjected to ultraviolet light treatment by passing under 6 48-inch Hanovia lamps of 200 watts per square inch intensity at a speed of 65 feet per minute in an atmosphere containing 250 parts per million of oxygen (essentially nitrogen atmosphere). This treatment was followed by subjecting to an electron beam at less than 100 parts per million of oxygen (essentially nitrogen atmosphere) to a total of 5 megarads. The gloss of the resulting coated substrate was only 4 as tested by the 60° glossmeter.

The above coated substrate was compared to the same coated substrate which has not been pretreated with ultraviolet light and has been cured by electron beam of total dosage of 5 megarads in a nitrogen atmosphere (less than 100 parts per million of oxygen). This coated substrate was tested with the 60° glossmeter test and found to have a gloss reading of 78.

EXAMPLE 3

A cardboard substrate was coated by a machined metal applicator with a coating composition comprising 65.3 parts by weight of a vehicle containing 90.5 percent by weight of bis(acryloxy ethyl) phthalate and 9.5 percent by weight of 2-ethyl hexyl acrylate and 34.7 parts by weight of a pigment composition comprising 98.8 percent titanium dioxide and 1.2 percent phthalocyanine blue with one percent by weight based on both vehicle and pigment of Triganol 14. The coating had a dry film thickness of 3–4 mils.

The above coated substrate was subjected to ultraviolet light treatment by passing under 6 48-inch Hanovia lamps of 200 watts per square inch intensity at a speed of 65 feet per minute in a nitrogen atmosphere containing 250 parts per million of oxygen. This treatment was followed by subjecting to an electron beam in a nitrogen atmosphere of less than 100 parts per million of oxygen to a total dosage of 5 megarads. The gloss of the resulting coated substrate was found to be only 3.

The above coated substrate was compared to the same coated substrate which has not been pretreated with ultraviolet light and has been cured by electron beam of total dosage of 5 megarads in a nitrogen atmosphere having less than 100 parts per million of oxygen. This coated substrate was tested with the 60° glossmeter test and found to have a gloss reading of 81.

EXAMPLE 4

A cardboard substrate was coated by a machined metal applicator with a coating composition comprising 33.3 parts by weight of a vehicle containing 30 percent styrene, and 70 percent by weight of a polyester having the composition of 5 moles of maleic anhydride, 5 moles of phthalic anhydride, and 10 moles of propylene glycol and 66.7 percent by weight of titanium dioxide pigment with one percent by weight based on both vehicle and pigment of Triganol 14. The coating had a dry film thickness of 3–4 mils.

The above coated substrate was subjected to ultraviolet light treatment by passing under 6 48-inch Hanovia lamps of 200 watts per square inch intensity at a speed of 65 feet per minute in a nitrogen atmosphere containing 250 parts per million of oxygen. This treatment was followed by subjecting to an electron beam at less than 100 parts per million of oxygen (essentially nitrogen atmosphere) to a total of 5 megarads. The glass of the resulting coated substrate was found to be only 4.

The above coated substrate was compared to the same coated substrate which has not been pretreated with ultraviolet light and has been cured by electron beam of total dosage of 5 megarads in a nitrogen atmosphere having less than 100 parts per million of oxygen. This coated substrate was tested with the 60° glossmeter test and found to have a gloss reading of 100.

According to the provisions of the patent statutes, there is described above the invention and what are now considered to be its best embodiments. However, within the scope of the appended claims, it is to be understood that the invention can be practiced otherwise than as specifically described.

What is claimed is:

1. The method of obtaining a film with a non-glossy surface comprising subjecting a composition comprising a substantially solventless, actinic light-sensitive, ionizing irradiation-sensitive material and one or more flatting pigments to actinic light in an inert atmosphere containing less than about 150 parts per million of oxygen and subsequently subjecting the material to ionizing irradiation to cure.
2. The method of claim 1 wherein the ionizing irradiation treatment is carried out in an active oxygen-containing atmosphere.
3. The method of claim 1 wherein the ionizing irradiation treatment is carried out in an inert atmosphere.
4. The method of claim 1 wherein the actinic light-sensitive, ionizing irradiation-sensitive material contains a polyacrylate.
5. The method of claim 1 wherein the actinic light-sensitive, ionizing irradiation-sensitive material contains an unsaturated polyester resin.
6. The method of claim 1 wherein the material contains a photosensitizer.
7. The method of claim 1 wherein the material contains at least about 5 percent by weight of the flatting pigments.
8. The method of claim 7 wherein the flatting pigment is titanium dioxide.
9. The method of coating a substrate to form a non-glossy surface comprising applying to the substrate a composition comprising a substantially solventless, actinic light-sensitive ionizing irradiation sensitive material, and one or more flatting pigments and subjecting to actinic light in an inert atmosphere containing less than about 150 parts per million of oxygen and subsequently subjecting the coating to ionizing irradiation to cure.
10. The method of claim 9 wherein the ionizing irradiation treatment is carried out in an active oxygen-containing atmosphere.
11. The method of claim 9 wherein the ionizing irradiation treatment is carried out in an inert atmosphere.
12. The method of claim 9 wherein the actinic light-sensitive, ionizing irradiation-sensitive material contains a polyacrylate.
13. The method of claim 9 wherein the actinic light-sensitive, ionizing irradiation-sensitive material contains an unsaturated polyester resin.
14. The method of claim 9 wherein the material contains a photosensitizer.
15. The method of claim 9 wherein the composition comprises at least about 5 percent by weight of the flatting pigment.
16. The method of claim 15 wherein the flatting pigment is titanium dioxide.
17. The film formed by the method of claim 1.
18. The coated material formed by the method of claim 9.

References Cited
UNITED STATES PATENTS

| | | | |
|---|---|---|---|
| 3,531,317 | 9/1970 | Patheiger et al. | 117—93.31 |
| 3,560,237 | 2/1971 | Miller | 117—93.31 |
| 3,619,392 | 11/1971 | Metzner et al. | 117—93.31 |

WILLIAM D. MARTIN, Primary Examiner

J. H. NEWSOME, Assistant Examiner

U.S. Cl. X.R.

117—161 UC, 161 K; 204—159.19, 159.22